United States Patent
Brooker et al.

(10) Patent No.: US 9,910,881 B1
(45) Date of Patent: Mar. 6, 2018

(54) MAINTAINING VERSIONS OF CONTROL PLANE DATA FOR A NETWORK-BASED SERVICE CONTROL PLANE

(71) Applicant: Amazon Technologies, Inc., Reno, NV (US)

(72) Inventors: Marc Brooker, Seattle, WA (US); Madhuvanesh Parthasarathy, Renton, WA (US); Tao Chen, Sammamish, WA (US); Marc Levy, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 995 days.

(21) Appl. No.: 14/105,111

(22) Filed: Dec. 12, 2013

(51) Int. Cl.
*G06F 17/30* (2006.01)

(52) U.S. Cl.
CPC .. *G06F 17/30356* (2013.01); *G06F 17/30073* (2013.01)

(58) Field of Classification Search
CPC ................................................ G06F 17/30356
USPC ................................................ 707/662, 704
See application file for complete search history.

(56) References Cited

U.S. PATENT DOCUMENTS

| | | | |
|---|---|---|---|
| 6,631,386 B1 * | 10/2003 | Arun ................ | G06F 17/30309 707/5 |
| 7,526,479 B2 | 4/2009 | Zenz | |
| 7,657,581 B2 | 2/2010 | Orenstein et al. | |
| 8,489,566 B2 | 7/2013 | Guo et al. | |
| 8,572,047 B2 | 10/2013 | Morimoto et al. | |
| 2010/0251242 A1 * | 9/2010 | Sivasubramanian | G06F 17/30306 718/100 |
| 2012/0221538 A1 * | 8/2012 | Liedes ............. | G06F 17/30221 707/704 |

* cited by examiner

*Primary Examiner* — Chelcie Daye
(74) *Attorney, Agent, or Firm* — Robert C. Kowert; Meyertons, Hood, Kivlin, Kowert & Goetzel, P.C.

(57) ABSTRACT

A system may implement maintaining control plane data versions for a network-based service control plane. Various control plane actions may be performed which create new versions of control plane data that may be maintained for the control plane in a database. Some of these actions may be performed by multiple actors creating new versions of the same control plane data. For a particular control plane action, a new version number may be obtained to include in a new version of control plane data, and a conditional write request may be performed to insert the new version of control plane data at the database as part of an optimistic concurrency technique in order to maintain consistency for control plane data.

21 Claims, 11 Drawing Sheets

MAINTAINING VERSIONS OF CONTROL PLANE DATA FOR A NETWORK-BASED SERVICE CONTROL PLANE

BACKGROUND

Network-based services have become ubiquitous providers of many different kinds of services that were once relegated to custom-built systems for which individual customers had to invest significant time and resources developing. Now many different customers that require various different types of computations, analysis, coordination, storage, content distribution, communications, or other resources may utilize network-based services that offer customers the ability to meet their needs without investing in systems of their own. However, as network-based services have grown in popularity, customers are becoming more sophisticated in their use. While not necessarily returning to significant investment in their own assets, customers of network-based services may now find the simplicity of network-based services to be limiting when trying to develop more customized solutions using network-based services. Thus, increasing the information and capabilities available to customers with respect to interacting with network-based services becomes more crucial to continuing to meet the customer's evolving needs.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement maintaining versions of control plane data for the control plane, according to some embodiments. A network-based service interacts with clients of the network-based service in different ways. Direct access may be provided to service resources (e.g., systems, devices, services, or other components of a service that provide various functionalities of the network-based service). In some embodiments, access to a network-based service may also be provided through interaction with a network-based service control plane. A control plane may serve many purposes in a network-based service. Client requests to register, start, stop, configure, increase, decrease, or otherwise control service resources may be directed to a control plane for performance. Control planes may also provide many other functions of a network-based service that are internal or hidden from service clients. Health or status checks, replication/failover, workload balancing, repair, as well as the various steps that may be included in servicing a particular client request, are just some of the many different examples of functions that a control plane provides a network-based service.

Figure 11:
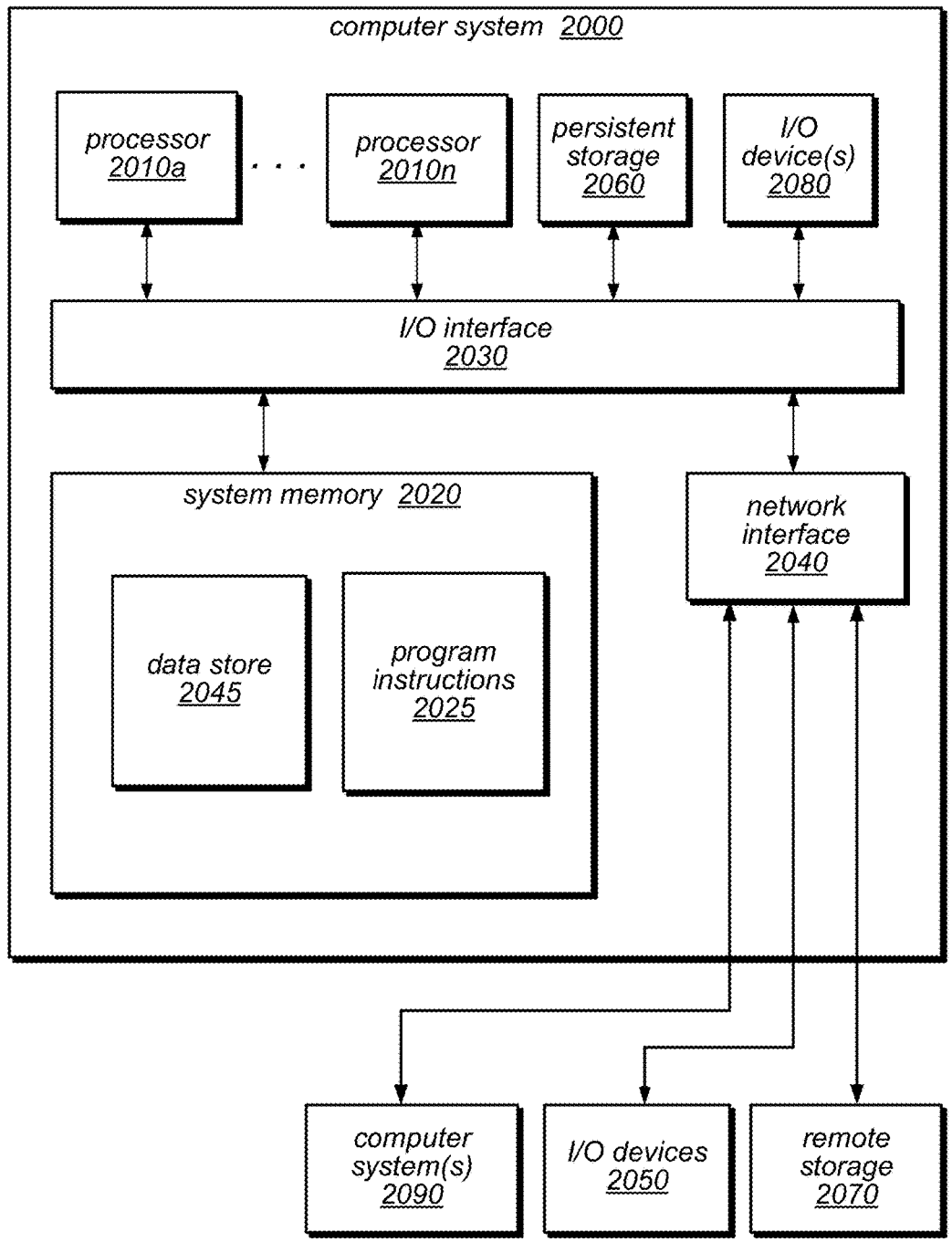
FIG. 11 is a block diagram illustrating an example computing system, according to some embodiments.

A control plane for a network-based service may, in various embodiments, be implemented by multiple different systems, nodes, devices or other components (e.g., computing system 2000 described below with regard to FIG. 11). These multiple components may have overlapping roles and/or responsibilities as part of the control plane. For example, multiple nodes may be responsible for repairing, or replacing service resources that are not meeting performance standards. If, however, both of the two components attempt to perform actions to repair a same resource, then only one component may be able to complete the repair. Control plane data may, in various embodiments, record, store, track, or otherwise maintain information describing control plane actions, resources, or any other aspect of a network-based service. Control plane data may be stored in a database system, such as SQL-based, or NoSQL-based, database. In the example of the two competing repair components above, each component may attempt to update the control plane data with respect to the particular resource that is being repaired. Both components may obtain the current version of the control plane data for the resource and attempt to write new configuration data for the resource into the current version of the control plane data maintained in the database. However, both components may use a conditional write request to insert the new configuration data such that the write is only successful if the current configuration data is the same as was obtained from the database for the resource. In this way, only one component may successfully perform the write, and thus the repair. Using this technique, however, the previous version of control plane data is replaced, and thus any future utility gained from prior versions of control plane data lost.

Figure 1:
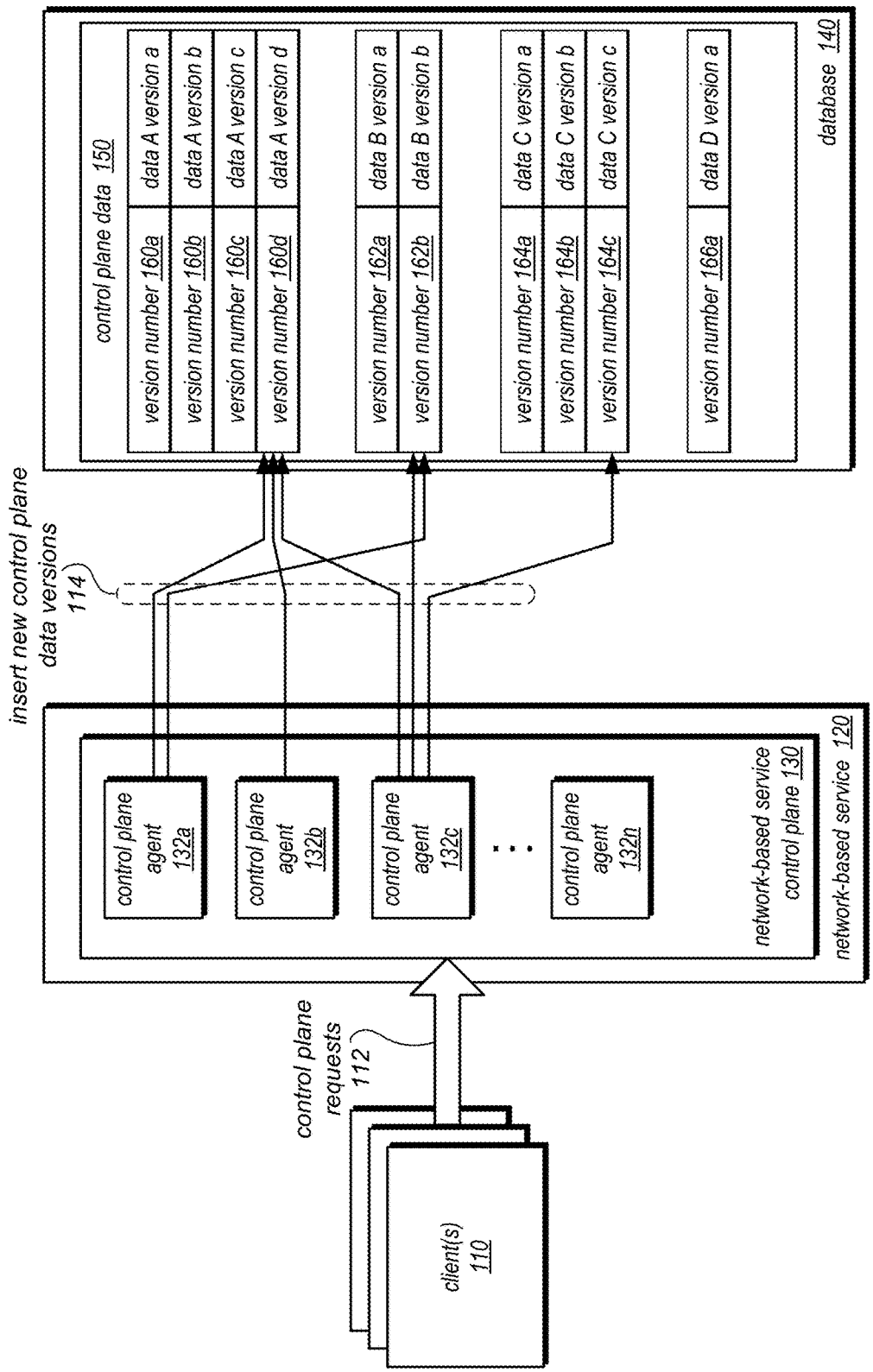
FIG. 1 is a block diagram illustrating maintaining versions of control plane data for a network-based service control plane, according to some embodiments.

FIG. 1 is a block diagram illustrating maintaining versions of control plane data for a network-based service control plane, according to some embodiments. A network-based service 120 offers various functionalities of the service to multiple client(s) 110, such as access to or use of service resources (e.g., storage or compute instances). Clients, which may be systems or devices (e.g., computing system 2000 described below with regard to FIG. 11) configured to communicate with network-based service 120 and/or network-based service control plane 130 to utilize the various service functions or resources of network-based service 120. New versions of control plane data 150 describing actions, resources, or other information related to network-based service 120 may be maintained in database 140.

For example, in some embodiments, a client 110 may send a control plane request 112 to network-based control plane service 130. Network-based control plane service 130 may implement various control plane agents 132, such as agents 132a, 132b, 132c through 132n, to service or perform control plane actions, such as may be instigated by control plane request 112. Control plane agent 132c, for instance, may perform the control plane action and/or generate a new version of control plane data (e.g., data C version c) to be maintained at database 140. Control plane agent 132c may determine a new version number for the new version of control plane data (e.g., version number 164c) and insert the new control plane data version 114 at database 140 by performing a conditional write request to insert the data. A conditional write request may generally be a write request that is performed where a condition of the write request is true or satisfied. In various embodiments, a condition of the write request may be based, at least in part, on a new version number for a new version of control plane data (e.g., version 154c). Thus, if version 164c does not exist, then the new version of data C version c may be written.

In some embodiments, multiple control plane agents 132 may attempt to insert new versions of the same control plane data. For example control plane agents 132a, 132b, and 132c are all attempting to insert a new version for data A version d, or control plane agent 132a, and control plane agent 132c trying to insert new data B version b. In various embodiments, only one of the control plane agents may be successful as each control plane agent may be performing a conditional write request such that the write is performed if the new version, data A version d does not exist. If one of the 3 agents successfully writes, then the other two agents may not satisfy the condition of their respective conditional writes when trying to insert new control plane data versions 114. Inserting new versions of control plane data may, in various embodiments, not replace prior versions of control plane data.

In some embodiments, data retention policies may be identified and maintained versions of control plane data may be evaluated to identify versions of control plane data to delete from database 140. For, example, version numbers 160a, 160b, 160c, 160d, 162a, 162b, 164a, 164b, 164c, and 166a, (and their corresponding control plane data) may each be individually evaluated for a retention determination. Versions of control plane data may, in some embodiments, also be used to service information requests from clients 110 in response to requests for versions of control plane data 150, such as those versions of control plane data that may be associated with a particular account. In some embodiments control plane requests 112 may include request version numbers which may be used to determine whether a particular request may be performed.

Please note that previous descriptions are not intended to be limiting, but are merely provided as an example of maintaining versions of control plane data for network-based service control planes. Various other components may store control plane data or communicate with a client. Other differences, for example, such as the number of clients or the number of tables, control planed agents, or any other component may also be different than illustrated in FIG. 1.

This specification begins with a general description network-based service with a control plane, which may implement maintaining versions of control plane data for the control plane. Then various examples of a network-based service are discussed, including different components/modules, or arrangements of components/module that may be employed as part of implementing services, such as a virtual computing resource provider and/or a block data storage service. A number of different methods and techniques to implement maintaining versions of control plane data for a network-based control plane are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
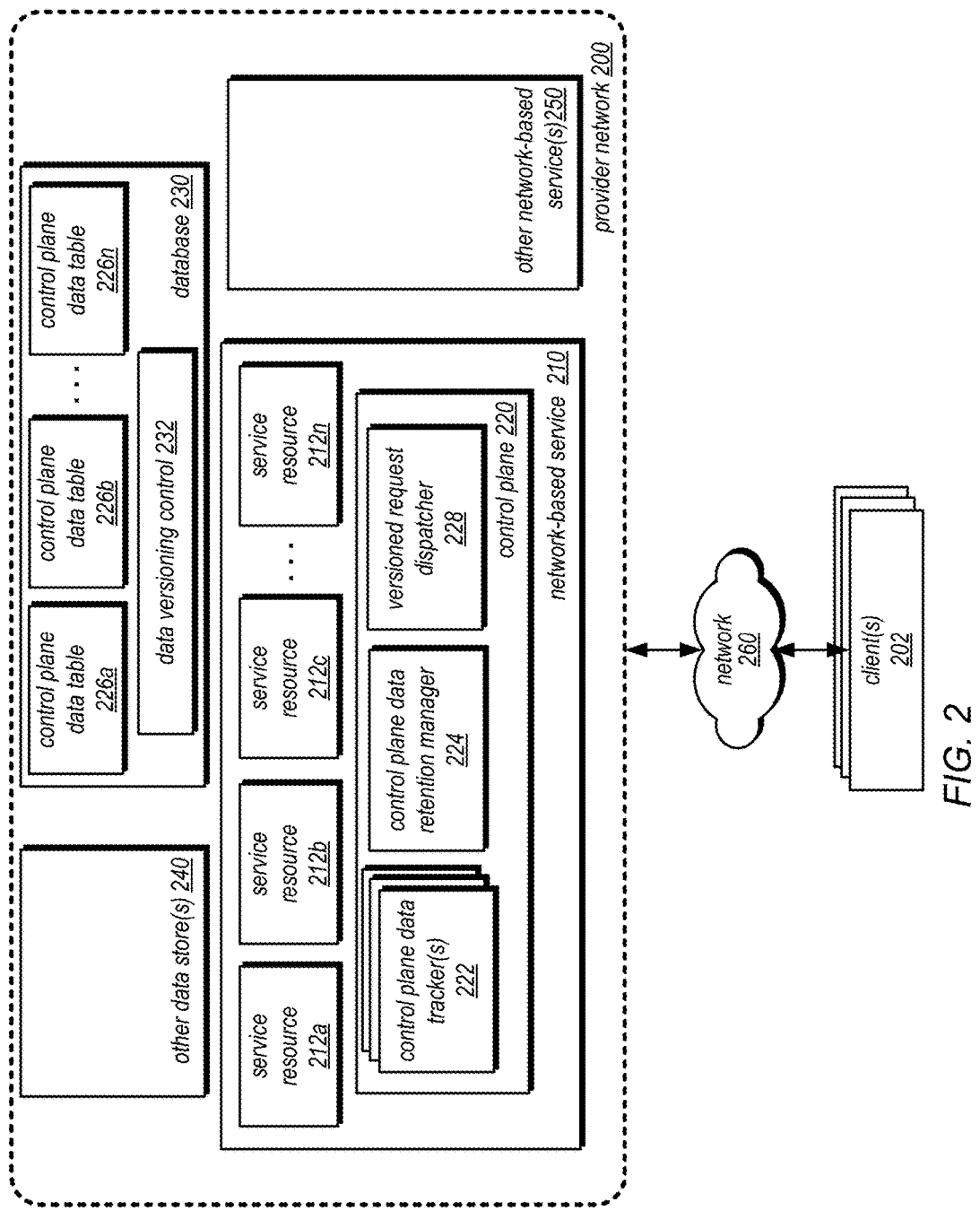
FIG. 2 is a block diagram illustrating an operating environment for a network-based service maintaining versions of control plane data for a control plane, according to some embodiments.

FIG. 2 is a block diagram illustrating an operating environment for a network-based service maintaining versions of control plane data for a control plane, according to some embodiments. Provider network 200 may be set up by an entity such as a company or a public sector organization to provide one or more network-based services (such as various types of cloud-based computing or storage) accessible via the Internet and/or other networks to clients. Such a provider network 200 may include numerous data centers hosting various resource pools, such as collections of physical and/or virtualized computer servers, storage devices, networking equipment and the like, needed to implement and distribute the infrastructure and services offered by the provider network 200.

In various embodiments, provider network 200 may implement a network-based service 210. Network-based service 210 may provide various kinds of computational, processing, analysis, simulation, storage or other type of services. In various embodiments, network-based service may implement various service resources 212, such as 212a, 212b, 212c, through 212n. These resources may provide services like data storage, computational resources or other type of service to clients 202. In at least some embodiments, the resources may in some embodiments be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the service resources 212 of the provider network 200 in different embodiments, including general purpose or special purpose computer servers, storage devices, network devices and the like. In some embodiments clients 202 or a user may be provided direct access to a service resource 212, e.g., by giving a user an administrator login and password. Service instances 212 may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client 202 applications, without for example requiring the client 202 to access a service resource 212.

Service resources 212 may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing, block data storage, and/or cluster file systems). Size of service resources, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length. The previous descriptions are not intended to be limiting, but merely illustrative of the many different configurations possible for a service resource 212 of provider network 200.

In various embodiments, network-based service 210 may implement a network-based service control plane 220. Control plane 220 may be made up of one or more computing nodes, servers, or other computing devices, such as computing system 2000 described below with regard to FIG. 11. Control plane 220 may generally provide various management and control functions for network-based service 201, such as managing service resources 212. Control plane 220 may be configured to implement one or more service endpoints configured to receive and process network-based services requests, such as requests to access data (or records thereof). For example, control plane 220 may include hardware and/or software configured to implement a particular endpoint, such that an HTTP-based network-based services request directed to that endpoint is properly received and processed. In one embodiment control plane 220 may be implemented as a server system configured to receive network-based services requests from clients 202 and to forward them to service resources 212 for processing. In other embodiments, control plane 220 may be configured as a number of distinct systems (e.g., in a cluster topology) implementing load balancing and other request management features configured to dynamically manage large-scale network-based services request processing loads. In various embodiments, control plane 220 may be configured to support REST-style or document-based (e.g., SOAP-based) types of network-based services requests.

In addition to functioning as an addressable endpoint for clients' network-based services requests, in some embodiments, control plane 220 may implement various user account management features. For example, control plane 220 may coordinate the metering and accounting of user usage of network-based services, including storage resources, such as by tracking the identities of requesting clients 202, the number and/or frequency of client requests, the size of data (such as database tables or records thereof) stored or retrieved on behalf of clients 202, overall storage bandwidth used by clients 202, class of storage requested by clients 202, or any other measurable client usage parameter. Control plane 220 may also implement financial accounting and billing systems, or may maintain a database of usage data that may be queried and processed by external systems for reporting and billing of client usage activity. In certain embodiments, control plane 220 may be configured to collect, monitor and/or aggregate a variety of network-based service 210 operational metrics, such as metrics reflecting the rates and types of requests received from clients 202, bandwidth utilized by such requests, system processing latency for such requests, system component utilization (e.g., network bandwidth and/or storage utilization within the storage service system), rates and types of errors resulting from requests, characteristics of stored and requested data or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 202 to enable such clients to monitor their usage network-based service 210.

In some embodiments, control plane 220 may also implement user authentication and access control procedures. For example, for a given network-based services request to access a particular portion of data, such as a particular compute cluster, control plane 220 may be configured to ascertain whether the client 202 associated with the request is authorized to access the particular compute cluster. Control plane 220 may determine such authorization by, for example, evaluating an identity, password or other credential against credentials associated with the particular database, or evaluating the requested access to the particular database against an access control list for the particular data. For example, if a client 202 does not have sufficient credentials to access the particular compute cluster, control plane 220 may reject the corresponding network-based services request, for example by returning a response to the requesting client 202 indicating an error condition.

Figure 3:
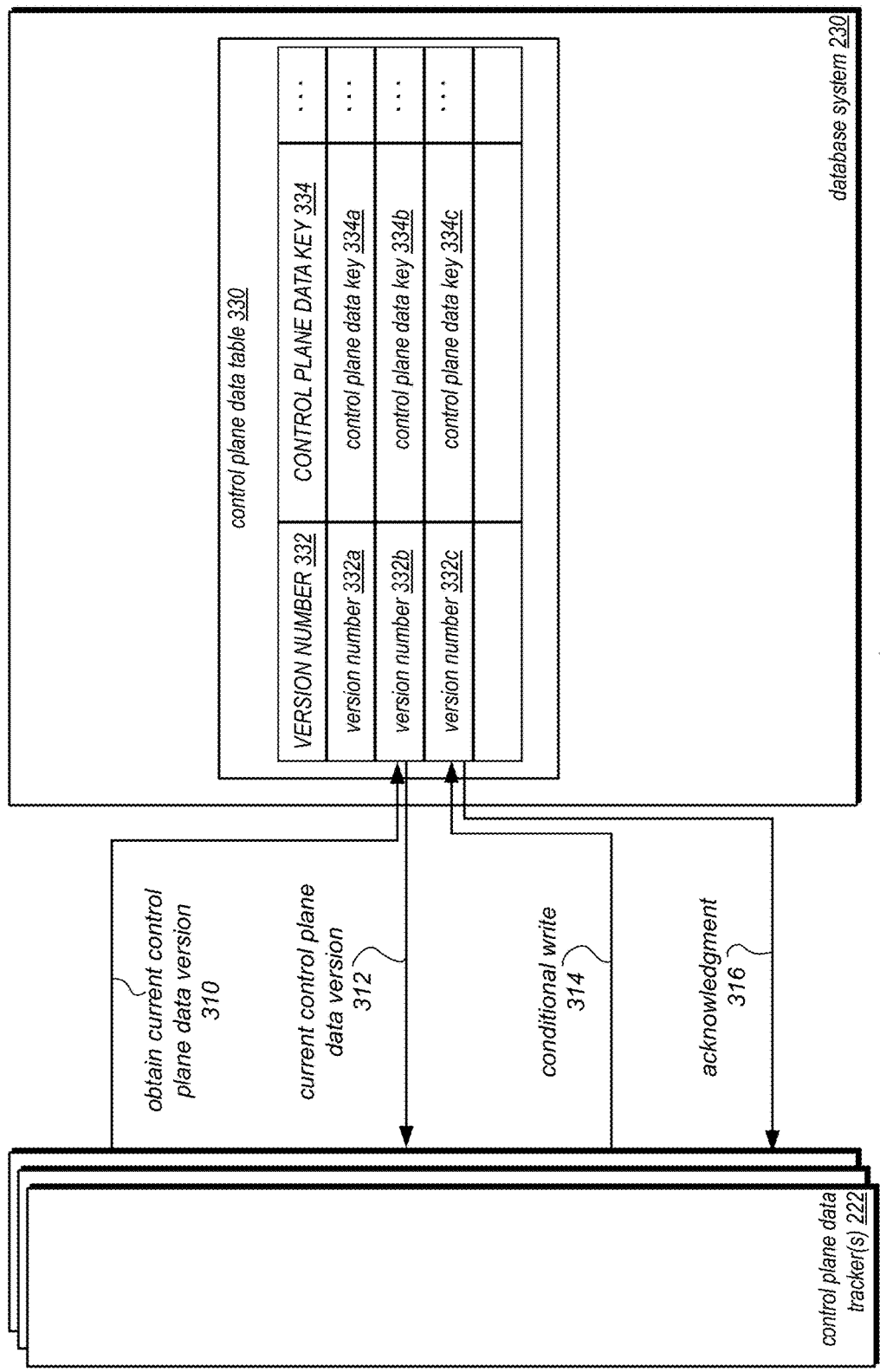
FIG. 3 is a block diagram illustrating interactions between a control plane data trackers and a database system maintaining control plane data versions, according to some embodiments.
Figure 6:
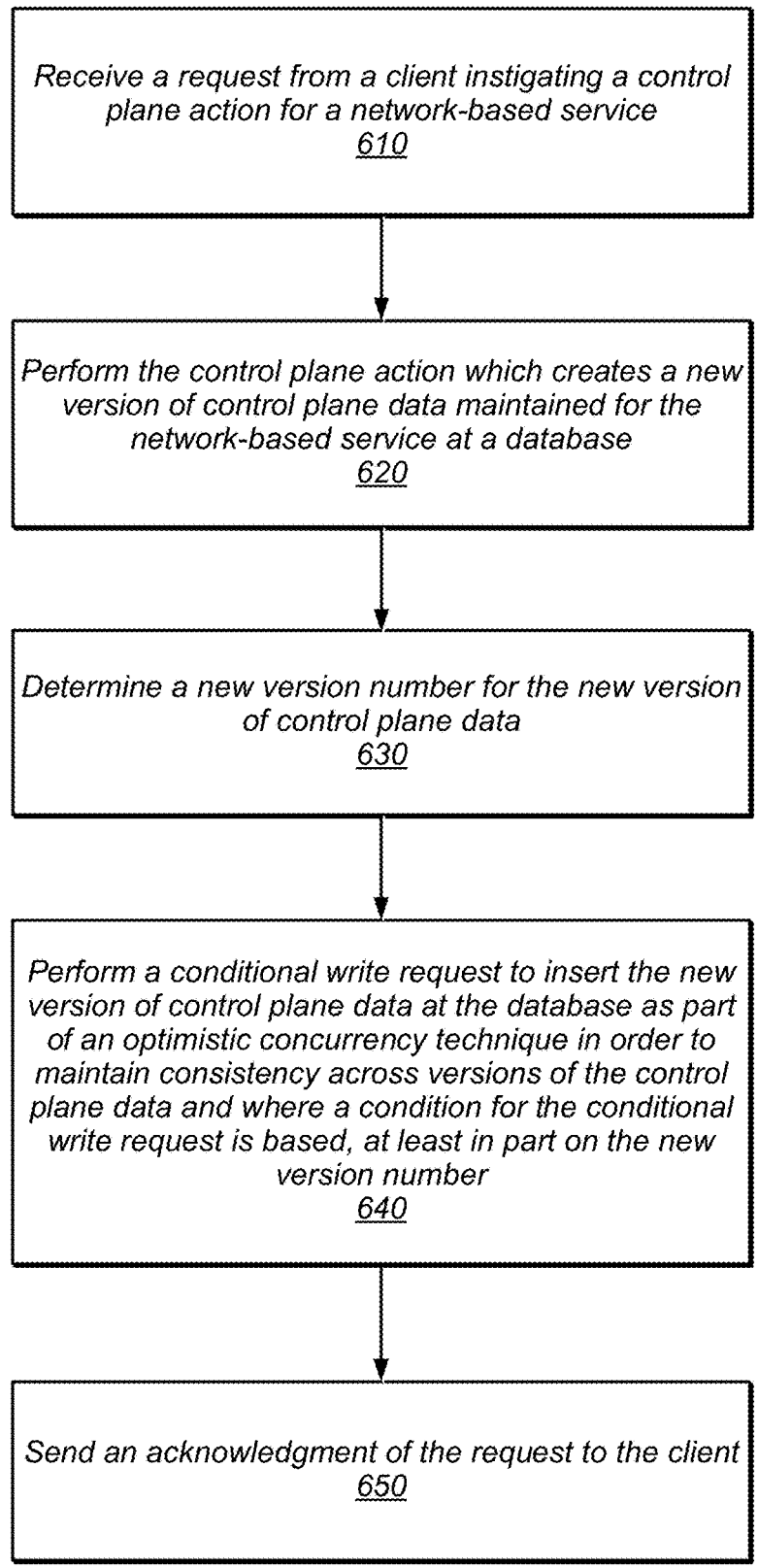
FIG. 6 is a high-level flowchart illustrating various methods and techniques for maintaining versions of control plane data for a network-based service control plane, according to some embodiments.
Figure 7:
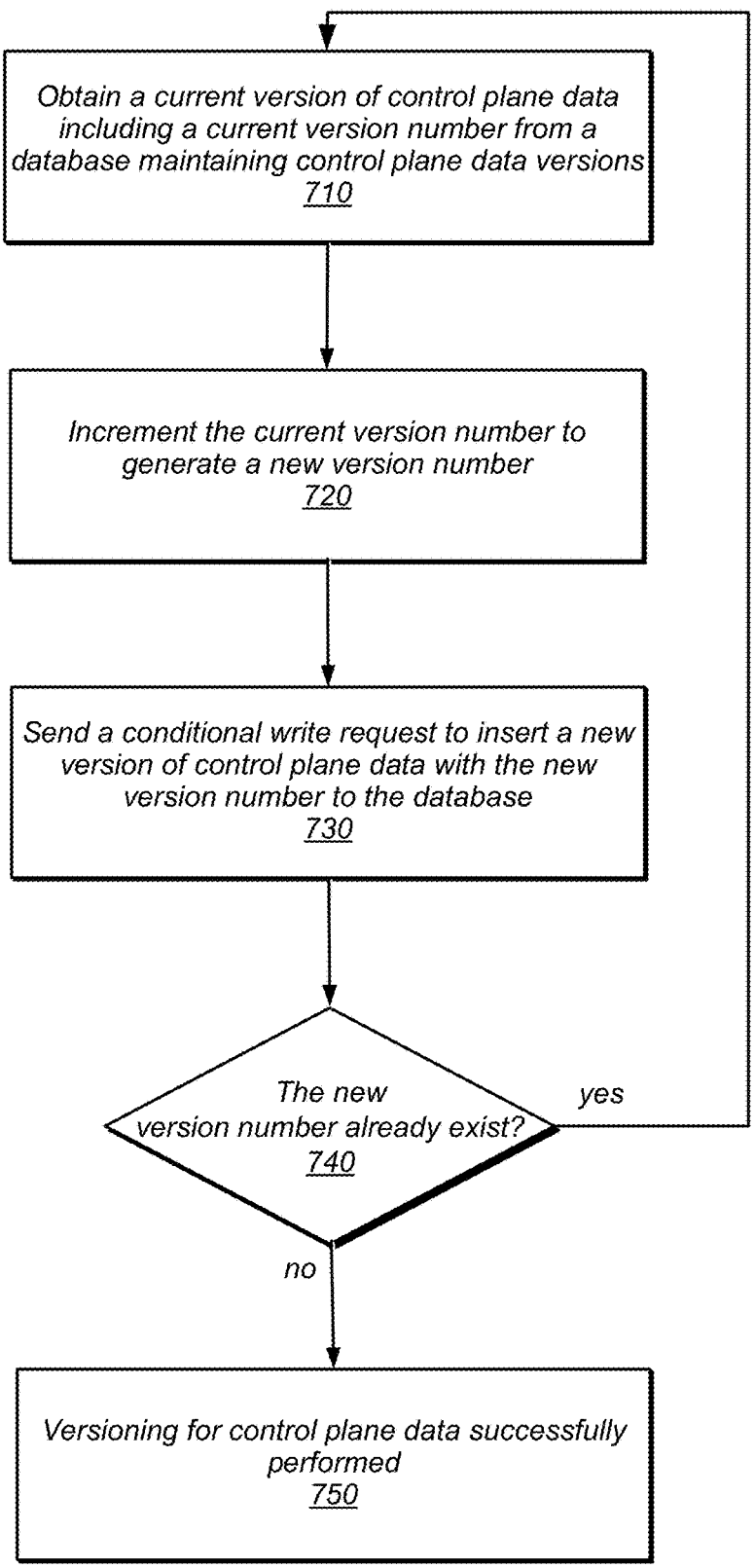
FIG. 7 is high-level flowchart illustrating various methods and techniques for performing versioning for control plane data, according to some embodiments.

In some embodiments, control plane 220 may implement control plane data tracker(s) 222. Control plane data tracker(s) 222 may be implemented as part of system components, nodes, devices, servers, applications, or other portions of control plane 220 that perform, direct, manager, or are aware of control plane actions performed by control plane 220. In some embodiments, control plane data tracker(s) 222 may be implemented as part of control plane agents (as described above with regard to FIG. 1). Control plane actions may be performed in response to requests from client(s) 202, or in response to trigger events or requests from other components of control plane 220. In various embodiments, control plane data tracker(s) 222 may store versions of control plane data maintained for the control plane in database 230. Control plane data may be maintained in different ones of control plane data tables 226, such as database tables 226a, 226b through 226n. For example, control plane data versions associated with a particular user account may be maintained in a particular data table, such as control plane data table 226a. Other organizations of control plane data, such as data tables for particular control plane actions, or service resource configurations 212 may also be implemented. As multiple control plane data tracker(s) 222 may wish to create and store new versions of control plane data for the same control plane data, control plane data tracker(s) 222 may be configured to perform conditional write requests as part of an optimistic concurrency technique to maintain consistency of control plane data versions in database 230. FIGS. 3, 6 and 7, provide further details and various different methods and techniques which control plane data tracker(s) 222 may employ.

In some embodiments, control plane 220 may implement control plane data retention manager 224 to remove control plane versions from database 230. For example, control plane data retention manager 224 may be configured to identify data retention policies for control plane data versions, evaluate control plane data versions, (e.g., in control plane data tables 226), and send delete requests to database 230 to remove control plane data versions that no longer need to be retained, in various embodiments. Control plane data retention manager 224 may implement the various techniques and methods discussed below with regard to FIGS. 4 and 8.

Figure 5:
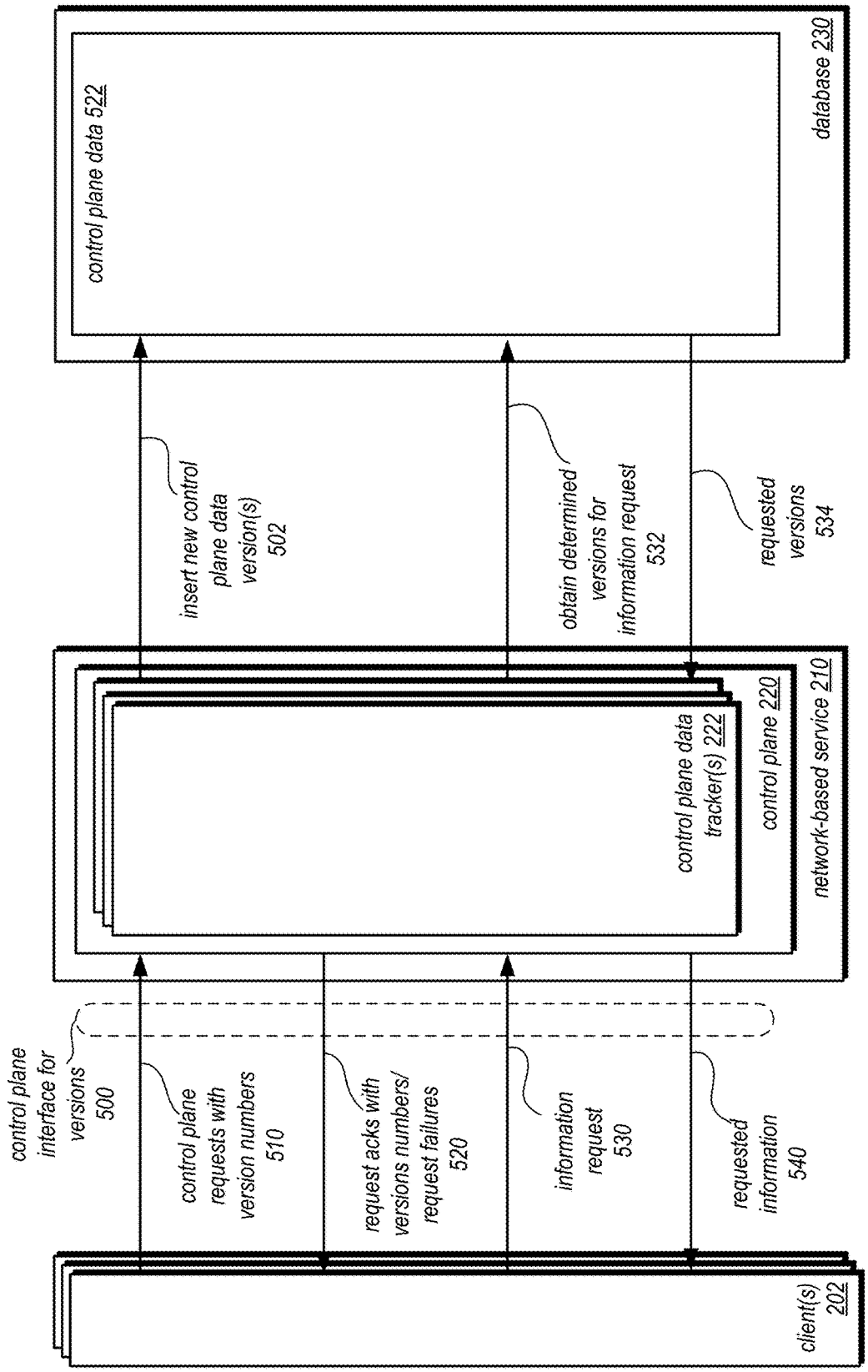
FIG. 5 is a block diagram illustrating interactions between a client, control plane of a network-based service, and database system providing versioning of control plane data accessible to a client, according to some embodiments.
Figure 10:
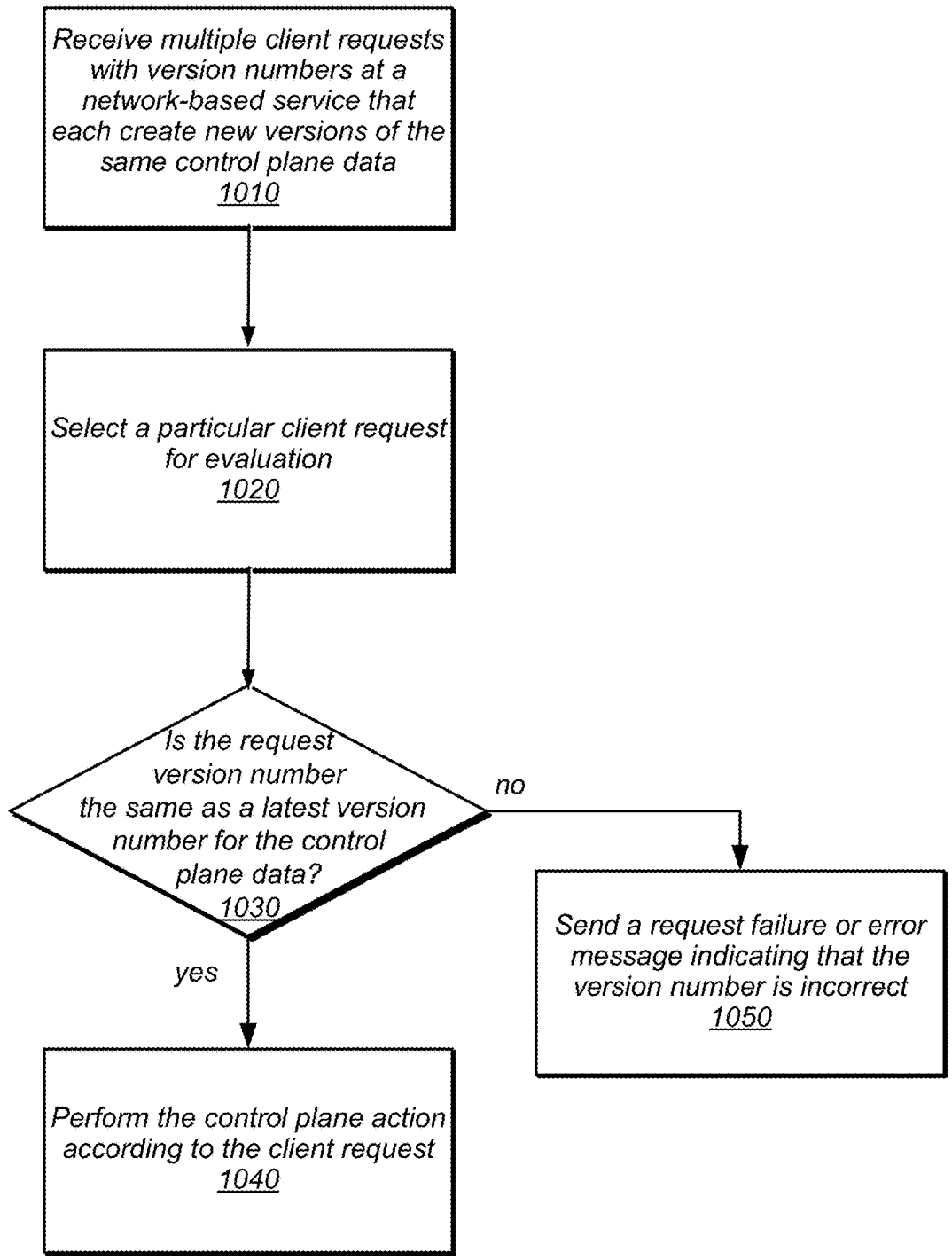
FIG. 10 is high-level flowchart illustrating various methods and techniques for implementing client control plane requests with versioning, according to some embodiments.

In some embodiments, control plane 220 may implement versioned request dispatcher 228, to handle control plane action requests from clients that include version request numbers. For example, multiple clients may send client requests initiating changes to the same control plane data. Version request numbers may be utilized by versioned request dispatcher 228 to determine which particular request to perform and which other requests to deny. FIGS. 5 and 10 provide further discussion of various techniques and methods that may be implemented to dispatch versioned client requests.

In some embodiments, provider network 200 may implement a database 230, which may be configured to maintain control plane data, such as in control plane data tables. Database 230 may, in some embodiments, be configured to perform conditional write requests. In some embodiments, new versions of control plane data may be sent to database 230 and data versioning control 232 may be configured to perform an optimistic concurrency technique to store new versions of control plane data without replacing previous versions of control plane data. Although illustrated as part of provider network 200, database 230 may also be implemented or controlled separately from provider network 200 and may be accessible to network-based service 210 and/or clients 202 (e.g., via network 260). In some embodiments, provider network 200 may implement multiple network-based services, such as other network-based services 250 (e.g., virtual computing resource provider and block data storage service). Provider network 200 may also implement other data stores 240, which may also store versions of control plane data which may be exported to other data stores 240 (e.g., for archival storage).

Clients 202 may encompass any type of client configurable to submit requests to provider network 200, including control plane action requests. For example, a given client 202 may include a suitable version of a web browser, or may include a plug-in module or other type of code module configured to execute as an extension to or within an execution environment provided by a web browser. Alternatively, a client 202 may encompass an application such as a database application (or user interface thereof), a media application, an office application or any other application that may make use of service resources 212 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 202 may be configured to generate network-based services requests according to a Representational State Transfer (REST)-style network-based services architecture, a document- or message-based network-based services architecture, or another suitable network-based services architecture.

In some embodiments, a client 202 (e.g., a computational client) may be configured to provide access to a service resource 212 in a manner that is transparent to applications implemented on the client 202 utilizing resources provided by the service 212. In such an embodiment, applications may not need to be modified to make use of the service model of FIG. 2. Instead, the details of interfacing to provider network 200 may be coordinated by client 202 and the operating system or file system on behalf of applications executing within the operating system environment at a client 202.

Clients 202 may convey network-based services requests to provider network 200 via a network. In various embodiments, a network may encompass any suitable combination of networking hardware and protocols necessary to establish network-based communications between clients 202 and provider network 200. For example, a network may generally encompass the various telecommunications networks and service providers that collectively implement the Internet. A network may also include private networks such as local area networks (LANs) or wide area networks (WANs) as well as public or private wireless networks. For example, both a given client 202 and provider network 200 may be respectively provisioned within enterprises having their own internal networks. In such an embodiment, a network may include the hardware (e.g., modems, routers, switches, load balancers, proxy servers, etc.) and software (e.g., protocol stacks, accounting software, firewall/security software, etc.) necessary to establish a networking link between given client 2020 and the Internet as well as between the Internet and provider network 200. It is noted that in some embodiments, clients 202 may communicate with provider network 200 using a private network rather than the public Internet.

As discussed above, control plane data tracker(s) 222 may be implemented as part of multiple control plane components, systems, or devices that are configured to perform control plane actions, in some embodiments. For control plane actions that initiate changes to control plane data creating new versions, control plane tracker(s) 222 may be configured to perform conditional write operations to insert new versions of control plane data. As different ones of these control plane data tracker(s) 222 may create new versions of the same control plane data, the conditional write operations may be performed as part of an optimistic concurrency control in order to provide consistency for control plane data versions. FIG. 3 is a block diagram illustrating interactions between a control plane data trackers and a database system maintaining control plane data versions, according to some embodiments.

Database system 230, as illustrated in FIG. 3, may maintain control plane data table 330. Control plane database 330 may include entries for different versions of control plane data. Version number 332 may be a version number or identifier (e.g., a monotonically increasing number) which may provide, in some embodiments, a relative positioning for a version with respect to other versions of control plane data in time (or some other ordering). In some embodiments, in addition to version number 332, a control plane data key 334 may be maintained. For example, in some embodiments, a database system be configured to implement a compound key, using a control plane data key 334 as a hash key (e.g., key that identifies particular control plane data) and version number 332 as a range key (e.g., the key according to which order the control plane data is arranged for a particular control plane data key 334. Thus, in FIG. 3, if all 3 illustrated versions of control plane data are the same control plane data, then control plane data key 334*a*, 334*b*, and 334*c* may be the same, while version number 332*a* may come before version 332*b*, which may come before version number 332*c*.

Control plane data tracker 222 may, in various embodiments, first obtain a current control plane data version 310 from control plane data table 330 (e.g., version 332*b*). The current control plane data version 312 may then be returned to control plane data tracker 222. Before, during, and/or after receiving current control plane data version 312, control plane data tracker 222 may perform other tasks operations. For example, the period of time between 312 and 314 may allow for other control plane data trackers 222 to insert a new version of control plane data in data table 330, creating a conflict and error when conditional write 314 is performed, in some embodiments. Control plane data tracker 222 may then be configured to generate or obtain a new version number for the new control plane data version. At some point, conditional write request 314 may then be sent to database 230. A conditional write request may be formatted according to an application programming interface (API) or other interface that performs a conditional write. For example, a conditional write may, in various embodiments, be a write request that is performed if a certain condition is true or satisfied. For example, the conditional write request 314 may be sent with the condition that the obtained or generated new version number (e.g., 332*c*) included in the conditional write request 314 is not yet written (e.g., if version 3321 does not exist then write version 3321). Thus, if successful, version 332*c*, control plane data key 334*c*, and other control plane data for the new version may be inserted in the control plane data table 330. An acknowledgment 316 of the successful write (or a failure/error message) may be sent to control plane data tracker 222. In various embodiments, control plane data tracker(s) 222 may implement various techniques to maintain or insert new versions of control plane data for a network-based service control plane, such as by implementing different portions of the methods and techniques described below with regard to FIGS. 6 and 7.

Figure 4:
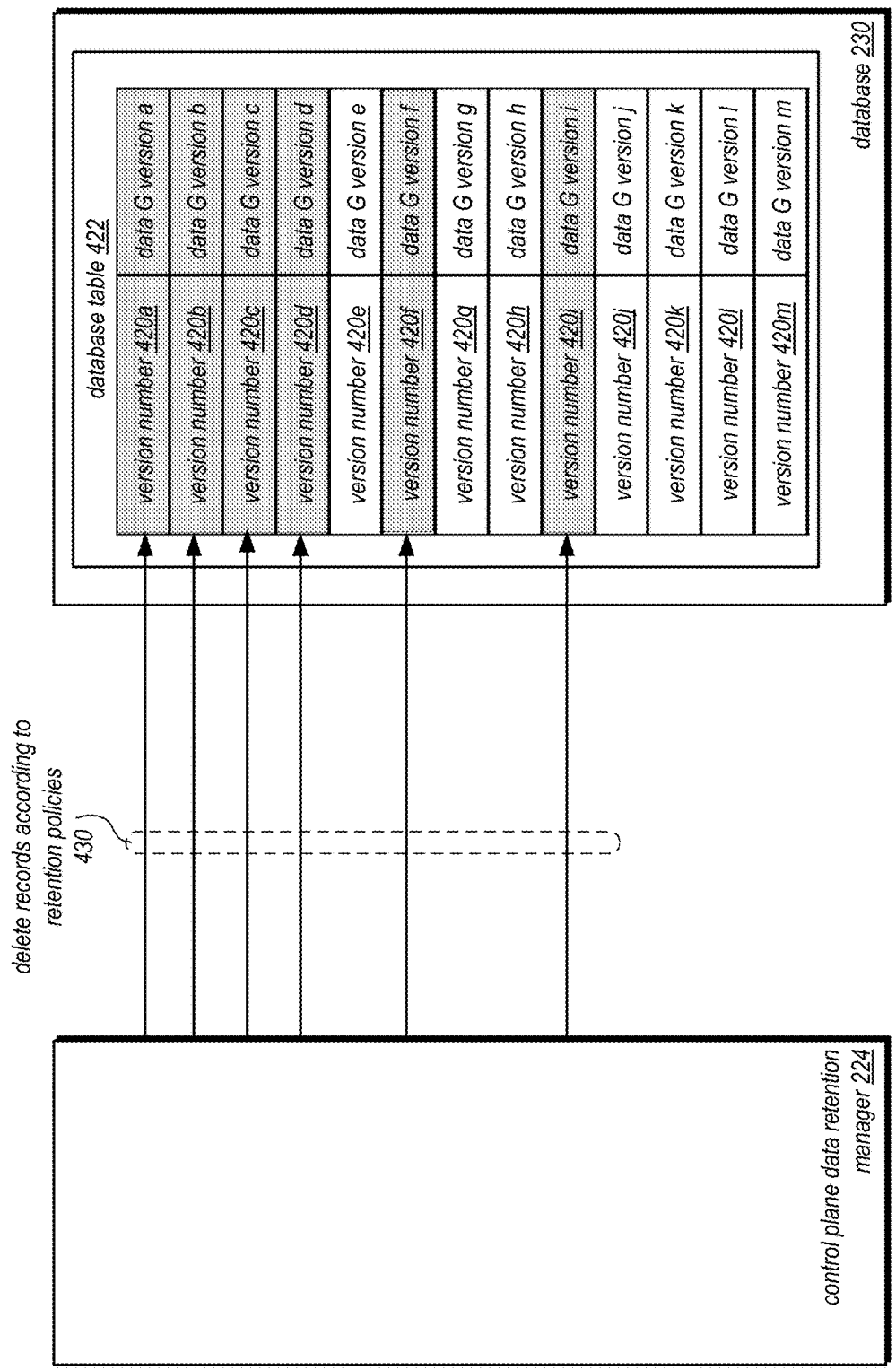
FIG. 4 is a block diagram illustrating interactions between a control plane data reclamation manager and database maintaining control plane data versions, according to some embodiments.

As new control plane data versions are inserted and maintained at a database, the number of control plane data versions maintained may continue to increase. As time passes, the number control plane data versions maintained may exceed storage efficiency or usefulness. FIG. 4 is a block diagram illustrating interactions between a control plane data reclamation manager and database maintaining control plane data versions, according to some embodiments. Control plane data retention manager 224 may be configured to perform various techniques for the detection, determination, performance, and/or management of control plane data versions maintained in database 230. As illustrated in FIG. 4, the different versions of control plane data 420 are maintained in a database table 422. Database table 422 may, as discussed above, maintain control plane data for a particular user account, a particular resource, a particular action, or any other organizational scheme or granularity of control plane data.

Control plane data retention manager 224 may be configured to detect when to perform deletion or other removal techniques for control plane data versions at database 230.

For example, in some embodiments, control plane data retention manager may operate on a schedule, such as particular time of day or night. In some embodiments, control plane data retention manager 224 may detect when a number of control plane data versions are stored or when an amount of time has passed since the last performance or evaluation of control plane data versions to identify versions for deletion. Data retention policies may be specific to a particular user account, and or based on a particular user account. For example, in some embodiments, a particular user account may be designated premium (or some other special designation) that implements retention policies that may maintain most (or all) of control plane data versions associated with a premium account. In another example, the usage history of a user account may be used to determine a retention policy specific to that user account. Data retention policies may restrict versions to different amounts of time, data (e.g., number of rows, size of data), and or may be based on the data itself. Some data retention policies may be global, applied to all control plane data versions maintained in a database. Data retention policies may be sophisticated or dynamically created and/or applied to control plane data versions, in some embodiments.

Figure 8:
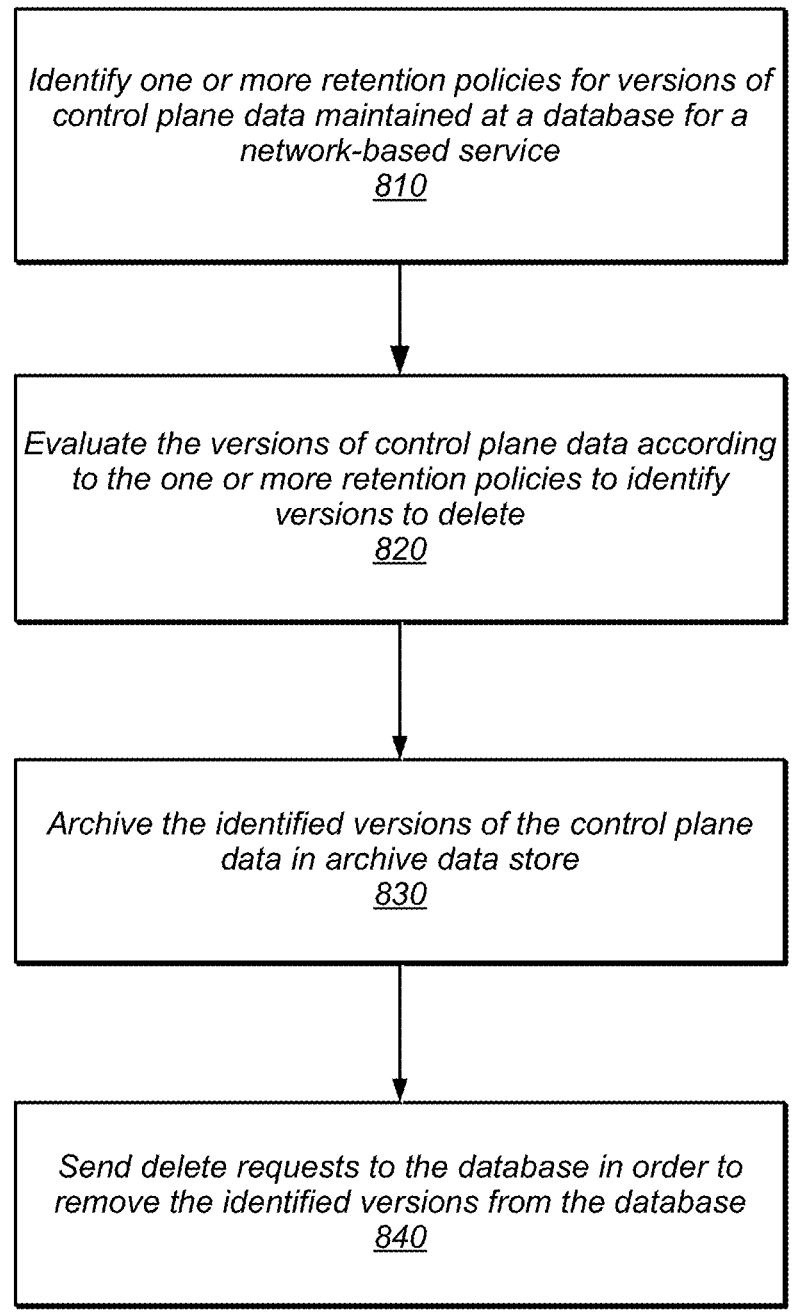
FIG. 8 is a high-level flowchart illustrating various methods and techniques for control plane data version retention, according to some embodiments.

Control plane data retention manager may be configured to perform various evaluation and reclamation techniques, such as those described below with regard to FIG. 8. In some embodiments, control plane data retention manager 224 may perform a sweep, scan, or other traverse of database table 422, to evaluate control plane data versions. In some embodiments, control plane data retention manager may utilize some kind of heuristic (e.g., one or more retention policies) which may be updated by a control plane in order to modify the heuristic differently for different control plane data. Particular retention policies to apply may be identified, and then used to evaluate the control policy data versions. For example, some versions of control plane data may be check points such that all check point control plane data versions may no longer need to be retained after a period of time. In another example some versions of control plane data, such as may indicate a particular type of action or configuration change of a resource, may need to be retained, while other types do not. Control plane data retention manager 224 may be configured to implement various types of decision engines to determine the application of data retention policies, in various embodiments.

Control plane data versions may, in some embodiments, be marked for removal (e.g., in an index structure or other set of metadata maintained at control plane data retention manager 224). For example, in FIG. 4, control plane data G versions number 420*a*, 420*b*, 420*c*, 420*d*, 420*f* and 420*i* have been identified for deletion, while versions 420*e*, 420*g*, 420*h*, 420*j*, 420*k*, 420l, and 420*m* have been retained. Deletion requests 430 may be sent to database 230 in order to remove the marked entries. In some embodiments, marked control plane data versions may be archived to an archival data store prior to deletion. In some embodiments, periodic, aperiodic, or schedule back ups of control plane data versions may be made (precluding a need to explicitly archive control plane data versions marked for deletion).

FIG. 5 is a block diagram illustrating interactions between a client, control plane of a network-based service, and database system providing versioning of control plane data accessible to a client, according to some embodiments. In some embodiments control plane 220 may implement a control plane interface for versions 500. Control plane interface for versions 500 may be a programmatic interface (e.g., an API) and/or a graphical interface (e.g., a GUI) via which clients may be exposed to or utilize/obtain control plane data versions.

For example, in some embodiments, a control plane request with a request version number 510 may be received at control plane 220. The control plane request may a request to perform any type of control plane action which may initiate a change in control plane data 522. For example, a control plane action may be a request to reconfigure a resource of a network-based service (e.g., a virtual compute instance or a data storage volume). The control plane request 510 may include a request version number which may indicate to the control plane the expected version (from the client 202's perspective) of control plane data, and thus the current configuration of the resource. The control plane request 510 may be a request to change the configuration of the resource as described in a current version of control plane data 522 to a new configuration as described in a new version of control plane data 522. Control plane 220 or a component of control plane 220 such as versioned request dispatcher 228 may determine whether or not the request version number is still the current version number for the control plane data 422 (e.g., by querying database 210). If the request version number is the latest version, then a new control plane data version 502 may be inserted in the control plane data 522 according to the techniques illustrated in FIG. 3 and discussed below with regard to FIG. 6. An acknowledgment 520 along with a new version number may be sent to the client 202. If multiple client(s) 202 attempt to request control plane actions 510 creating new versions of the same control plane data 522, the included request version numbers may act as a concurrency control mechanism for client 202 requests 510. For example, in some embodiments, only one control plane request 510 may be successful for a given version number. Other client requests 510 may have request version numbers less than the latest version number, and receive request failures 520. In some embodiments, the request failure may indicate the new latest version number. Failing requests may need to either send the request with a new version number, or cease sending the request.

In some embodiments, versions of control plane data 522 may be provided to clients 202 or used to service client requests. For example, an information request for 530 may be sent to control plane 220 via control plane interface for versions 500. Control plane data versions used to service the information request may be determined. For example, the information request may be for changes made to a particular resource over time or the number of times a particular action is performed. Corresponding versions for these control plane actions may be obtained. A control plane data tracker 222, data retention access manager (e.g., data retention access manager 224 in FIG. 2), versioned request dispatcher (e.g., dispatcher 228 in FIG. 2) or other component of control plane 220 may be configured to obtain determined 532 of control plane data 522 from database 230. For example, control plane data tracker 222 may send an SQL request to database 230 for specific versions of control plane data 522, e.g., versions related to a particular action (e.g., reconfigure security settings). Database 230 may send requested versions 534 of control plane data 522 back to control plane data tracker 222. In some embodiments, control plane data versions may then be used to generate requested information 540 made available to client(s) 202. In some embodiments, request control plane data versions may be exported to some other data store accessible to clients 202 which may then directly obtain the control plane data versions from the data store.

The examples of maintaining versions of control plane data for a network-based service control plane discussed above with regard to FIGS. 2-5 have been given in regard to a provider network of network-based services. Various other types or combinations of systems may implement these techniques. For example, a network-based service may utilize a third-party or private database system separate from the provider network to maintain control plane data. FIG. 6 is a high-level flowchart illustrating various methods and techniques for maintaining versions of control plane data for a network-based service control plane, according to some embodiments. These techniques may be implemented using different control plane data trackers implemented on multiple control plane agents, or any other component of a network-based service that may perform client requests for a network-based service.

As indicated at 610, a request may be received from a client instigating a control plane action for a network-based service, according to various embodiments. A client request may directly request the performance of a particular control plane action (e.g., such as requesting the reconfiguration of a particular resource or service offered by a network-based service provider via an API or other interface for control plane actions), or the client request may indirectly trigger one or more control plane actions (e.g., request data from a particular resource, which may have recently suffered data loss, triggering one or more control plane actions to restore the requested data to the particular resource). In various embodiments, control plane actions may be performed without a client request. For example, control planes may perform control plane actions to implement various maintenance or other configuration functions which repair, reconfigure, or otherwise alter resources or services provided by a network-based service. However instigated, in various embodiments, the control plane action which creates a new version of control plane data maintained for the network-based service at a database may be performed, as indicated at 620. In some embodiments, the new version of control plane data may be created by applying changes locally to a current version of control plane data obtained from the database.

As indicated at 630, a new version number to include in the new version of control plane data may be determined, in some embodiments. The new version number may be obtained, in some embodiments, by querying the database to determine the version number for the current or latest version of control plane data (which is to be succeeded by the new version of control plane data). In other embodiments, the current version number may be obtained from some other centralized or consistent store that maintains information about the control plane data versions.

As indicated at 640, based, at least in part, on the new version number, a conditional write request to insert the new version of the control plane data at the database may be performed. In various embodiments, the conditional write request may be performed as part of an optimistic concurrency technique in order to maintain consistency across versions of control plane data. A condition for the conditional write request may be based, at least in part, on the determined new version number (e.g., condition is satisfied when new version does not exist). For example, in various embodiments multiple clients, agents, or other systems or devices may perform control plane actions that create new versions of the same control plane data. In order to ensure that some consistent ordering of control plane data versions is maintained, a conditional write request may be performed for a new version of control data until a correct version number for the version of control plane data is obtained and included with the conditional write request. In at least some embodiments, the new control plane data version may not replace previous control plane data versions maintained at the database. Instead, the new version of the control plane data version may be an addition to the control plane data versions maintained at the database. In various embodiments, the conditional write request may be directed toward the particular control plane data that may be associated with a user account associated with the control plane data. For example, the conditional write request may be formatted as to be directed toward a particular table maintain control plane data for the particular user account associated with the resource, action, or other information described in the data plane control data.

FIG. 7 is high-level flowchart illustrating various methods and techniques for performing versioning for control plane data, according to some embodiments. As indicated at 710, a current version of control plane data including a current version number may be obtained from the database, as indicated at 710. A read request or other type of query for the current (or latest) version of control plane data may be sent to the database maintaining versions of control plane data. The current version number may then be incremented (e.g., atomically) to generate a new version number, as indicated at 720. Generating the new version number may, in various embodiments, be performed by determining the next version number for the control plane data versions according to a monotonically or atomically increasing number scheme. Other versioning number schemes may be implemented that provide a relative position of control plane data versions with respect to other control plane data versions, and a new higher version number scheme may be generated accordingly.

A conditional write may be sent, in various embodiments, to insert a new version of control plane data with the new version number to the database, as indicated at 730. In some embodiments, the database may implement an API or other interface or functionality that provides for a conditional write request. A query language (e.g., SQL) or other coded or created request may be used to perform a conditional write request in some embodiments where the database system does not provide a specific conditional write request function or interface. Although not illustrated in FIG. 7, in at least some embodiments, a new version of control plane data may be simply sent to a database system that implements versioning for stored data, where upon completion of storing the new version of data a version number for the data may be returned. Generally, a conditional write request may, as described above, perform a write if a particular condition is satisfied. For example, a conditional write request may insert a new version of control plane data if the new version number for the new version of control plane data does not already exist.

In various embodiments, it may be determined whether the new version already exists (and thus a corresponding version of the control plane data is maintained) at the database. In some embodiments, a success or failure message from the database system may be sent to a control plane. If the new version number already exists, as indicated by the positive exit from 740, then a new current version number may be obtained 710, a new, new version number generated 720, and a new conditional write request sent 730 until the new version number does not exist (as indicated by the negative exit from 740). These steps may be performed repeatedly until a successful conditional write request is performed (as indicated by line connecting the positive exit from 740 back to 710). While performing the various elements of FIG. 7, other actions (e.g., other control plane data trackers or components) may be taken that change or insert new versions for the control plane data, which may lead to concurrency conflicts. In some embodiments, processing or decision making as to whether the control plane action is to be performed may be implemented prior to returning back to element 710 as indicated by the positive exit form 740. For example, in some embodiments, a determination may be made as to whether the control plane action may be performed again, prior to performing various elements illustrated in FIGS. 6 and 7. For a successful conditional write, versioning for control plane data may then be considered successfully performed, as indicated at 750. Additional steps, configurations, or processes that may remain to be completed may then be triggered by the successful completion of versioning for the control plane data. For example, an acknowledgement (as indicated below at 650) may be sent to a client, or the effects of the control plane action (the new configuration of a network-based resource) may be made available.

As indicated at 650, in various embodiments an acknowledgment of the client request may be sent to the client. The acknowledgement may include a version number for the new version of control plane data created by the request. In some embodiments, error or failure messages may be sent for client requests that fail to complete, or timeout after trying to create new version of control plane data for a period of time. For example, in some embodiments the technique, as discussed above with regard to FIG. 7 may have a timeout period, after which the conditional write for a new version of control plane data is no longer attempted. In some embodiments, any changes made by or for the client request may be rolled back, and an error message may be sent.

As discussed above, over time maintaining different versions of control plane data in a database may cause the amount of stored data to grow indefinitely, if the different versions of control plane data are permanently persisted. The value of maintaining these different versions may lessen over time, and may vary depending on the different uses or functionalities maintaining such data may provide. For example, if versioning information is provided in order to implement some form of point-in-time restore, roll-back or other version change, the maintained versions may only be needed to support the times to which the control plane data may be restore. Versions in time, for instance, may be older than offered restore points, and thus no longer needed for such actions. Similarly, only some changes to control plane data (and their resultant versions/records) may be sufficiently interesting to preserve. Security audits, for instance, may only examine control plane actions involving access permissions and/or other security or access related changes. Given these examples, and many other possibilities, for determining whether records need to be retained, FIG. 8 is a high-level flowchart illustrating various methods and techniques for identifying and removing records of control plane data that may no longer need be retained, according to various embodiments.

As indicated at 810, one or more retention policies for versions of control plane data maintained at a database may be identified, in some embodiments. Generally, data retention policies may provide some kind of heuristic or determination as to whether a particular record need be still retained. Data retention policies, in some embodiments, may be specific to a user account, database table, or type of control plane data (e.g., action logs, resource states, or resource configurations). Consider a particular user account for records of control plane data are maintained in a database. The particular user account may authorize, opt-in, or request that control plane data records be maintained for future use (e.g., obtaining records of control plane data in response to a client request, as described in further detail below with regard to FIG. 9). Retention policies for that particular user account may account for requested retention preferences by the user (e.g., amount of time, or type of records or content associated with record kept). In some embodiments, network-based services may provide a guarantee or service-level agreement that stipulates various retention policies that may be enforced for records of control plane data. Data retention policies may also be general to the service and may be enforced in order to meet various service performance or operational characteristics, such as conserving database resources. For example, as discussed above in some embodiments, users of a network-based service may be unaware of the retained records of control plane data, and thus data retention policies may be crafted to support network-based service operational goals independent of user's preferences.

The versions maintained control plane data at a database may be evaluated according to the identified one or more retention policies in order to identify versions to delete from the database, as indicated at 820. As discussed above, different retention policies may apply different (and sometimes conflicting) determinations as to whether a particular version of control plane data is to be maintained. For example, one retention policy may specifically identify all versions of configuration data of a specific type as to be deleted, while another retention policy may require that all versions of configuration data be kept for a minimum period of time (e.g., 3 days). Various rules-based decision engines or other similar techniques may be used to make determinations for individual versions of control plane data, in some embodiments. Evaluations of the versions of control plane data may occur in various ways. For example, in some embodiments, a mark and sweep technique may be applied which reads through various versions of the control plane data and marking, identifying, or otherwise creating a list of versions to be deleted. Evaluation of versions of control plane data may occur at various times. For example, in some embodiments, evaluation (as well as identification of retention policies or sending of delete requests) may occur at times of low system utilization (e.g., at night). In some embodiments, evaluation (as well as identification of retention policies or sending of delete requests) may occur continuously, such as part of a foreground or background process.

As indicated at 830, in some embodiments, identified data versions may be archived to an archival data store. Archiving of control plane versions may also occur independently from identifying or deleting control plane data versions. For example, scheduled backups of control plane data versions may be performed where the versions are store in another data store (e.g., a data archive). In some embodiments, element 830, may not be performed.

As indicated at 840, once versions of control plane data have been identified for deletion, one or more delete requests may be sent to the database in order to remove the identified versions from the database, in various embodiments. In some embodiments, a component, system, or device performing the data retention techniques illustrated in FIG. 8 may have special permissions to delete versions of configuration data that are not granted to other components, such as control plane agents or other systems or devices that perform conditional write requests to insert new versions of control plane data.

Figure 9:
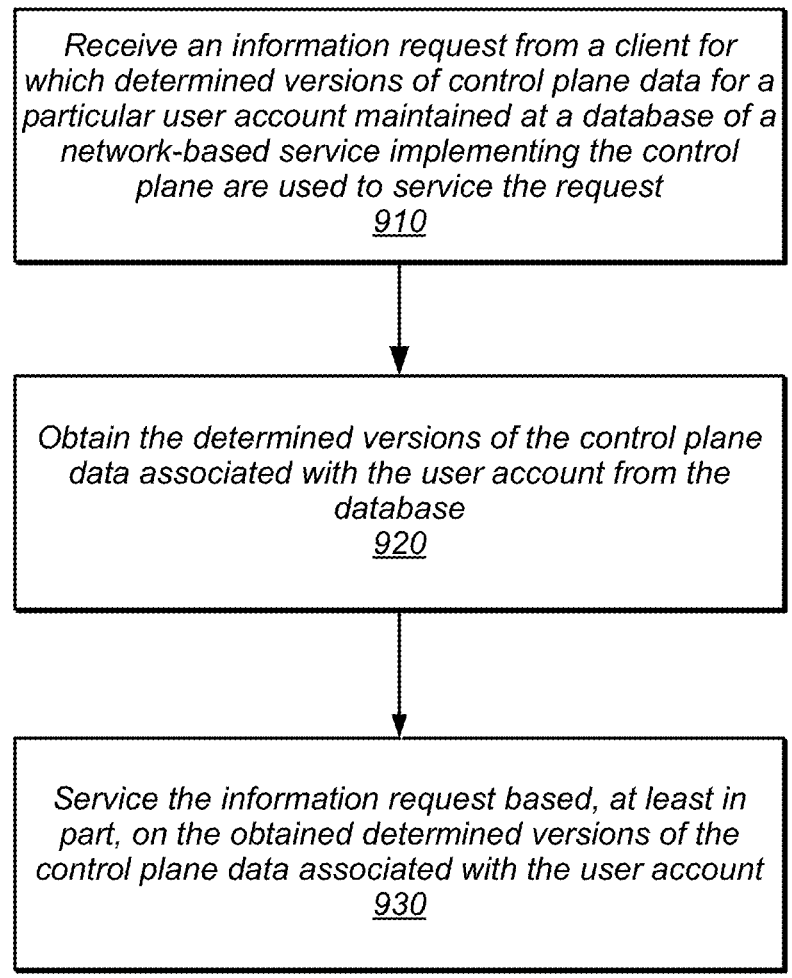
FIG. 9 is high-level flowchart illustrating various methods and techniques for providing control plane data versions to clients, according to some embodiments.

As noted above, versions of control plane data may be utilized to perform a variety of different functions with regard to a network-based service. Performance analysis (e.g., how often were certain tasks or actions performed), auditing of control plane actions (e.g., to determine whether unauthorized changes were/are made), providing version information to clients (as discussed in further detail below with regard to FIG. 10) allowing clients/and or the network-based system to provide greater consistency controls for client requests to the control plane, are a few examples of the many different ways version information for control planes may be used. For some of these uses clients may wish to, or be better equipped, to evaluate versions of control plane data. FIG. 9 is high-level flowchart illustrating various methods and techniques for providing control plane data versions to clients, according to some embodiments.

As indicated at 910, an information request may be received from a client for which determined versions of control plane data associated with a particular user account (or more broadly determined for the information request) maintained at a database may be used to service the information request, in various embodiments. Control plane data may, in some embodiments, be associated with a particular user account for a network-based service. For example, if the network-based service is a block data storage service, such as described above with regard to FIG. 2, control plane data regarding control plane actions for data volumes associated with a user account for the block data storage service, may maintain multiple previous and current versions.

In various embodiments the information request may make use of or identify a particular portion of control plane data (e.g., particular data fields in database table entry) or data from multiple different tables, objects, or other data structures in the database. These determined versions of control plane data may be determined according to the information request. For example, an API or other interface may provide different types of information requests (e.g., history of particular actions performed, history of a particular resources configuration, differences between a current configuration and a previous configuration, etc.). The versions of control plane data that may provide the information necessary to provide answers to information requests (e.g., the versions including particular actions, configuration information for the particular resources, and the current and previous configuration information) may be identified. The information request may use a particular type of control plane data (e.g., control plane actions performing a detach, reformat, attach, or other command). The request may also use a particular resource of the network-based control service (e.g., volume 1, compute instance 200, etc. . . . ) for which control plane data is maintained. More generally, any granularity or type of control plane data for which multiple versions of data are maintained may, in some embodiments, be utilized for servicing an information request.

As indicated at 920, in various embodiments, the determined versions of the control plane data associated with the user account may be obtained from the database. For example various queries or requests formatted according to the type of database (e.g., SQL requests for a SQL-based database, or other request formats for a NoSQL-based database) to access the requested versions. In some embodiments, access to control plane data versions may be enforced at the database, such that only control plane data versions for a particular user account may be returned for a particular request.

Once obtained, the information request may be serviced based, at least in part, on the determined control plane data versions, as indicated at 930. In some embodiments, the control plane data versions may be directly transferred to a client (e.g., by directly returning the data from the database via file transfer or other protocol). In some embodiments, however, the select versions may be analyzed, evaluated, reformatted, or extracted from to service the information request. For example, a request to identify configuration differences for a resource between the current configuration and some past configuration may be determined by examining the control plane data versions associated with each configuration, and identifying differences. In some embodiments, control plane data versions for an information request may be exported to a client accessible data store, such as another data storage service, from which a client may download the control plane data versions at will. A notification or other indication may be sent to a client providing instructions for obtaining the select versions of the control plane data (e.g., location and/or access credentials for obtaining the versions from another data store).

Control plane data may be maintained and understood according version numbers, in some embodiments. As discussed above with regard to FIGS. 1, 3, and 4, control plane data versions may include a version number identifying a relative position of a specific control plane data version when compared with other versions of the same control plane data. In some embodiments, version numbers and/or other versioning information may be provided to clients of a network-based service. As illustrated above in FIG. 5, acknowledgments and/or other responses from a control plane to a client may include a version number which may be the latest version number for specific control plane data and/or the version number for a version of control plane data describing a requested control plane action. In some embodiments, a control plane may utilize control plane version numbers in order to implement various consistency controls if, for example, multiple clients associated with a same user account, resource, or other object described by the same control plane data, may request control plane actions with respect to that same control plane data for client requests. FIG. 10 is high-level flowchart illustrating various methods and techniques for implementing client control plane requests with versioning, according to some embodiments.

As indicated at 1010, multiple client requests with version numbers may be received at a network-based service that each create new versions of the same control plane data. For example, if 2 different clients requests to perform some operation with respect to the same network-based resource (e.g., connect a data volume to another computing system), each client may send a request with a version number to perform the operation. A particular client request may be selected for evaluation, as indicated at 1020, in some embodiments. For example, the first received client request may be selected for evaluation, or the client request from a higher priority (or authority) client, may be selected.

However selected, the selected client request may then be evaluated based, at least in part, on the request version number included in the client request. For example, in some embodiments, a control plane may implement a request dispatcher (such as described above with regard to FIG. 2) or other component that may determine (or obtain) a latest (or most current) version number for the affected control plane data. A read or other type of request may be sent to the database, in some embodiments, in order to obtain the latest version number of the control plane data. The version number included in the request may then be compared with the latest version number for the control plane data, as indicated at 1030. If the latest version number and the request version number are the same, then the control plane action may be performed according to the client request as indicated at 1040. For example, if one of the two requests to connect the data volume to the other computing system has a request version number the same as the latest version number for the data volume (as described in the latest version of control plane data for the data volume), then the connection request may be performed.

In some embodiments, an acknowledgment of the completion of the request, along with a new version number for the new version of control plane data inserted into the database (according to the techniques described above in FIGS. 6 and 7). If, however, the request version number is not the same as the latest version (e.g., is a lower version number), then a request failure or error message indicating that the version number is incorrect may be sent to the client, as indicated at 1050. Continuing with the example described above, if the other client request to connect the data volume to another computing system may have the same version number as the other client request. However, as the other computing request may not be performed, the latest version number for the control plane data for the data value may be greater than the version number in the request, and a failure message may be sent to the other client. In this way, only one of the same two requests actually completes when including control plane data versions. In various embodiments, this may allow clients of network-based services to automate and/or distribute various requests of the control plane service among multiple different clients (e.g., for the same user account/resource) without creating consistency problems among the different clients which might wish to perform the same action (e.g., that may only need to be performed once).

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may be configured to implement the functionality described herein (e.g., the functionality of various servers and other components that implement the virtual computing resource provider described herein). The various methods as illustrated in the figures and described herein represent example embodiments of methods. The order of any method may be changed, and various elements may be added, reordered, combined, omitted, modified, etc.

Embodiments of maintaining versions of control plane data for a network-based service control plane as described herein may be executed on one or more computer systems, which may interact with various other devices. FIG. 11 is a block diagram illustrating an example computer system, according to various embodiments. For example, computer system 2000 may be configured to implement nodes of nodes of a virtual computing resource provider, a block-based data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the network-based service described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a network-based service, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. In general, system memory 2020 (e.g., data store 2045 within system memory 2020), persistent storage 2060, and/or remote storage 2070 may store data blocks, replicas of data blocks, metadata associated with data blocks and/or their state, configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 11 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   a plurality of compute nodes implementing a network-based service for a plurality of clients;
   one or more compute nodes of the plurality of compute nodes that together implement a plurality of control plane agents of a control plane for the network-based service for performing control plane actions, wherein different ones of at least some of the plurality of control plane agents perform control plane actions that create different versions of control plane data;
   a database that maintains the different versions of the control plane data for the network-based service and that is configured to perform conditional writes when updating data maintained at the database;
   the plurality of control plane agents, each configured to:
      receive a request from one of the plurality of clients that instigates a control plane action, wherein the control plane action creates a new version of the control plane data;
      in response to receiving the request:
         perform the control plane action;
         determine a new version number for the new version of the control plane data;
         perform a conditional write request to insert the new version of the control plane data as part of an optimistic concurrency technique in order to maintain consistency across versions of the control plane data, wherein the conditional write request comprises the new version number, wherein a condition for the conditional write request is based, at least in part, on the new version number such that the new version of the control plane data is not inserted if the condition is not satisfied; and
         send an acknowledgment of the request to the client.

2. The system of claim 1, wherein the control plane further comprises a control plane data retention manager, configured to:
   identify one or more retention policies for the versions of the control plane data including the new version maintained at the database;
   evaluate the versions of the control plane data including the new version to identify at least one version of control plane data to delete from the database; and
   send one or more delete requests to the database in order to remove the identified at least version from the database.

3. The system of claim 1, wherein the control plane is configured to:
   receive an information request from a client for which determined versions of the different versions of the control plane data maintained at the database are used to service the information request;
obtain the determined versions of the control plane data from the database; and
service the information request based, at least in part, on the determined versions of the control plane data.

4. The system of claim 1, wherein the request from the client instigating the control plane action includes a request version number, and wherein the control plane is configured to:
in response to receiving the client request:
determine that the request version number is the same as a latest version number prior to performing said performing the control plane action, said obtaining the new version number, said performing the conditional write, and said sending the acknowledgment.

5. A method, comprising:
performing, by one or more computing devices:
performing a control plane action that creates a new version of control plane data maintained for a network-based service in a database, wherein one or more previous versions of the control plane data are maintained in the database;
in response to performing the control plane action:
determining a new version number for the new version of the control plane data; and
performing a conditional write request to insert the new version of control plane data at the database as part of an optimistic concurrency technique in order to maintain consistency across versions of the control plane data, wherein the conditional write request comprises the new version number, wherein a condition for the conditional write request is based, at least in part, on the new version number such that the new version of the control plane data is not inserted if the condition is not satisfied, wherein the one or more previous versions are not replaced with the new version of the control plane data.

6. The method of claim 5, further comprising:
obtaining a current version of the control plane data from the database including a current version number for the current version;
wherein said determining the new version number for the new version of the control plane data comprises:
incrementing the current version number to generate the new version number; and
wherein said performing the conditional write request to insert the new version of control plane data at the database comprises:
sending the conditional write request including the new version of the control plane data to the database in order to insert the new version of the control plane data including the new version number.

7. The method of claim 6, wherein said performing the conditional write request to insert the new version of control plane data at the database further comprises:
in response to receiving a failure response for the conditional write request indicating that the new version number exists at the database, determining that the control plane action is still to be performed, and in response to determining that the control plane action is still to be performed, performing said obtaining the current version, said performing the control plane action, said incrementing the current version number, and said sending the conditional write request again in order to insert the new version of control plane data.

8. The method of claim 5, further comprising:
identifying one or more retention policies for the versions of the control plane data including the new version maintained at the database;
evaluating the versions of the control plane data including the new version to identify at least one version of control plane data to delete from the database; and
sending one or more delete requests to the database in order to remove the identified at least one version from the database.

9. The method of claim 8, further comprising prior to sending the one or more delete requests, archiving the identified at least one version to an archival data store.

10. The method of claim 5, wherein the previous versions of control plane data are associated with a particular user account for the network-based service, wherein a plurality of other versions of control plane data are maintained at the database that are associated with a plurality of other user accounts, and wherein the method further comprises:
receiving an information request from a client for which determined versions of the control plane data associated with the particular user account are used to service the information request;
obtaining, from the database, the determined versions of the control plane data associated with the particular user account; and
servicing the information request based, at least in part, on the determined versions of the control plane data associated with the particular user account.

11. The method of claim 5, further comprising:
receiving a request from a client instigating the control plane action;
in response to receiving the request from the client:
performing said performing the control plane action, said determining the new version number, and said performing the conditional write request; and
sending an acknowledgment of the request to the client.

12. The method of claim 11, wherein the previous versions of the control plane data are associated with a particular user account for the network-based service, wherein a plurality of other versions of control plane data are maintained at the database that are associated with a plurality of other user accounts, and wherein the method further comprises:
performing said receiving the request from the client, said performing the control plane action, said determining the new version number, said performing the conditional write request, and said sending the acknowledgment for a different client request associated with a different one of the plurality of other user accounts creating a new other version of control plane data associated with the different one user account.

13. The method of claim 11, wherein the request from the client instigating the control plane action includes a request version number, and wherein the method further comprises:
in response to receiving the client request:
determining that the request version number is the same as a latest version number for the control plane data prior to performing said performing the control plane action, said obtaining the new version number, said performing the conditional write request, and said sending the acknowledgment.

14. The method of claim 11, wherein another request from the client instigating another control plane action includes a request version number, and wherein the method further comprises:

in response to receiving the other client request:
  determining that the request version number is the not the same as the latest version number; and
  in response to determining that the request version number is the not the same as the latest version number, sending an error message to the client indicating that the request version number is incorrect.

15. The method of claim 5, wherein the network-based service is a block-based data storage service.

16. A non-transitory, computer-readable storage medium, storing program instructions that when executed by a plurality of computing devices cause the plurality computing devices to implement:
  performing a control plane action that creates a new version of control plane data maintained for a network-based service in a database, wherein one or more previous versions of the control plane data are maintained in the database;
  in response to performing the control plane action:
    determining a new version number for the new version of the control plane data; and
    performing a conditional write request to insert the new version of control plane data at the database as part of an optimistic concurrency technique in order to maintain consistency across versions of the control plane data, wherein the conditional write request comprises the new version number, wherein a condition for the conditional write request is based, at least in part, on the new version number such that the new version of the control plane data is not inserted if the condition is not satisfied, wherein the one or more previous versions are not replaced with the new version of the control plane data.

17. The non-transitory, computer-readable storage medium of claim 16, wherein the program instructions further cause the one or more computing devices to implement:
  obtaining a current version of the control plane data from the database including a current version number for the current version;
  wherein, in said determining the new version number for the new version of the control plane data, the program instructions further cause the one or more computing devices to implement:
    incrementing the current version number to generate the new version number; and
  wherein, in said performing the conditional write request to insert the new version of control plane data at the database, the program instructions further cause the one or more computing devices to implement:
    sending the conditional write request including the new version of the control plane data to the database in order to insert the new version of the data including the new version number.

18. The non-transitory, computer-readable storage medium of claim 16, wherein the program instructions further cause the one or more computing devices to implement:
  identifying one or more retention policies for the versions of the control plane data including the new version maintained at the database;
  evaluating the versions of the control plane data including the new version to identify at least one version of control plane data to delete from the database;
  archiving the identified at least one version of the control plane data to an archival data store; and
  sending one or more delete requests to the database in order to remove the identified at least version from the database.

19. The non-transitory, computer-readable storage medium of claim 16, wherein the previous versions of the control plane data are associated with a particular user account for the network-based service, wherein a plurality of other versions of control plane data are maintained at the database that are associated with a plurality of other user accounts, and wherein the program instructions further cause the one or more computing devices to implement:
  receiving an information request from a client for which determined versions of the control plane data associated with the particular user account are used to service the information request;
  obtaining, from the database, the determined versions of the control plane data associated with the particular user account; and
  servicing the information request based, at least in part, on the determined versions of the control plane data associated with the particular user account.

20. The non-transitory, computer-readable storage medium of claim 16, wherein the program instructions further cause the one or more computing devices to implement:
  receiving a request from a client instigating the control plane action including a request version number;
  in response to receiving the client request:
    determining that the request version number is the same as a latest version number for the control plane data prior to performing said performing the control plane action, said determining the new version number, said performing the conditional write request, and said sending the acknowledgment; and
  sending an acknowledgment of the request to the client.

21. The non-transitory, computer-readable storage medium of claim 16, wherein the network-based service is a virtual computing resource provider.

* * * * *